(12) United States Patent
Merkel et al.

(10) Patent No.: US 9,527,690 B2
(45) Date of Patent: Dec. 27, 2016

(54) MONITORING WEB SPEED OF MATERIAL WEB

(71) Applicant: SIEMENS AKTIENGESELLSCHAFT, München (DE)

(72) Inventors: Christian Merkel, Erlangen (DE); Wolf-Martin Rasenack, Marloffstein (DE); Mathias Rebling, Nuremberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 177 days.

(21) Appl. No.: 14/381,516

(22) PCT Filed: Feb. 27, 2013

(86) PCT No.: PCT/EP2013/053865
§ 371 (c)(1),
(2) Date: Aug. 27, 2014

(87) PCT Pub. No.: WO2013/127815
PCT Pub. Date: Sep. 6, 2013

(65) Prior Publication Data
US 2015/0001270 A1    Jan. 1, 2015

(30) Foreign Application Priority Data
Feb. 28, 2012    (DE) .................. 10 2012 203 002

(51) Int. Cl.
*B65H 23/032*    (2006.01)
*B65H 20/00*    (2006.01)
(Continued)

(52) U.S. Cl.
CPC .......... *B65H 20/005* (2013.01); *B65H 23/192* (2013.01); *B65H 26/00* (2013.01);
(Continued)

(58) Field of Classification Search
CPC ........................... B65H 23/032; B65H 23/038
See application file for complete search history.

(56) References Cited

U.S. PATENT DOCUMENTS 5,312,033 A    5/1994    Walton et al.
5,743,184 A *  4/1998    Skudrzyk ............ B41F 13/0045
                                                    101/181

(Continued)

FOREIGN PATENT DOCUMENTS

DE    26 13 600        10/1977
DE    692 02 132 T2     8/1995
(Continued)

OTHER PUBLICATIONS

International Search Report for PCT/EP2013/053865 dated Jun. 17, 2013.

*Primary Examiner* — Sang Kim
(74) *Attorney, Agent, or Firm* — Henry M. Feiereisen LLC

(57) ABSTRACT

A drive roller, driven by a motor, moves a material web on a set of rollers. The present rotational speed of the motor is detected. A current web speed is determined from the detected rotational speed and a diameter of the drive roller. The current web speed is compared with a specified target speed value and a specified threshold speed value of the web speed.

11 Claims, 2 Drawing Sheets

(51) Int. Cl.
*B65H 23/192* (2006.01)
*B65H 26/00* (2006.01)
*G01P 3/00* (2006.01)

(52) U.S. Cl.
CPC .......... *G01P 3/00* (2013.01); *B65H 2511/142* (2013.01); *B65H 2513/10* (2013.01); *B65H 2513/114* (2013.01); *B65H 2513/53* (2013.01); *B65H 2801/84* (2013.01)

(56) References Cited

U.S. PATENT DOCUMENTS

| | | |
|---|---|---|
| 2001/0027731 A1 | 10/2001 | Schramm |
| 2002/0133244 A1 | 9/2002 | Schroder et al. |
| 2011/0295429 A1 | 12/2011 | Schultze et al. |

FOREIGN PATENT DOCUMENTS

| | | |
|---|---|---|
| DE | 44 30 550 A1 | 2/1996 |
| DE | 101 04 795 A1 | 9/2002 |
| DE | 102008053249 A1 | 4/2010 |
| DE | 102012203002.6 | 2/2012 |
| EP | 0 698 572 A1 | 2/1996 |
| EP | 1 136 258 A2 | 9/2001 |
| GB | 1 553 443 | 9/1979 |

\* cited by examiner

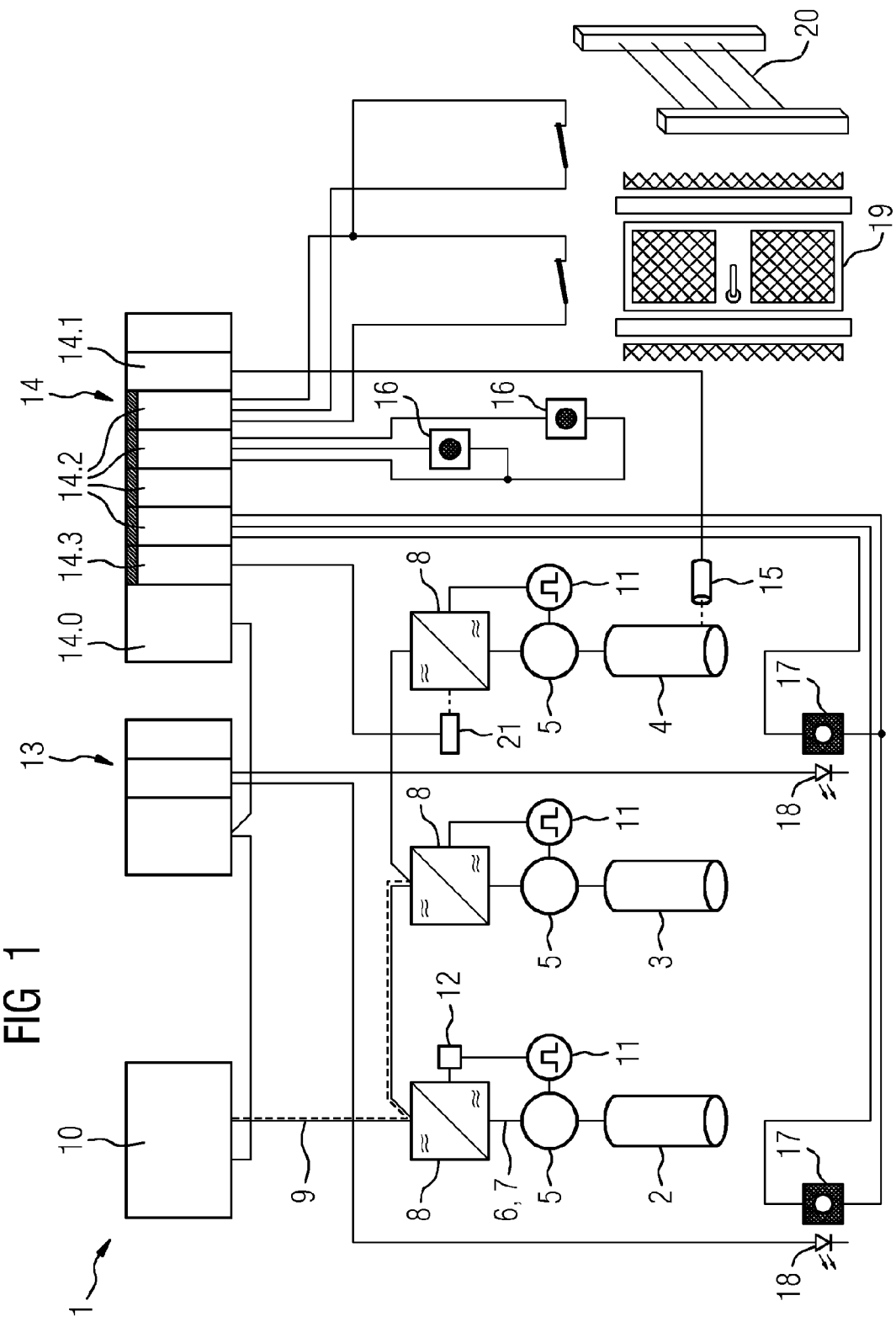

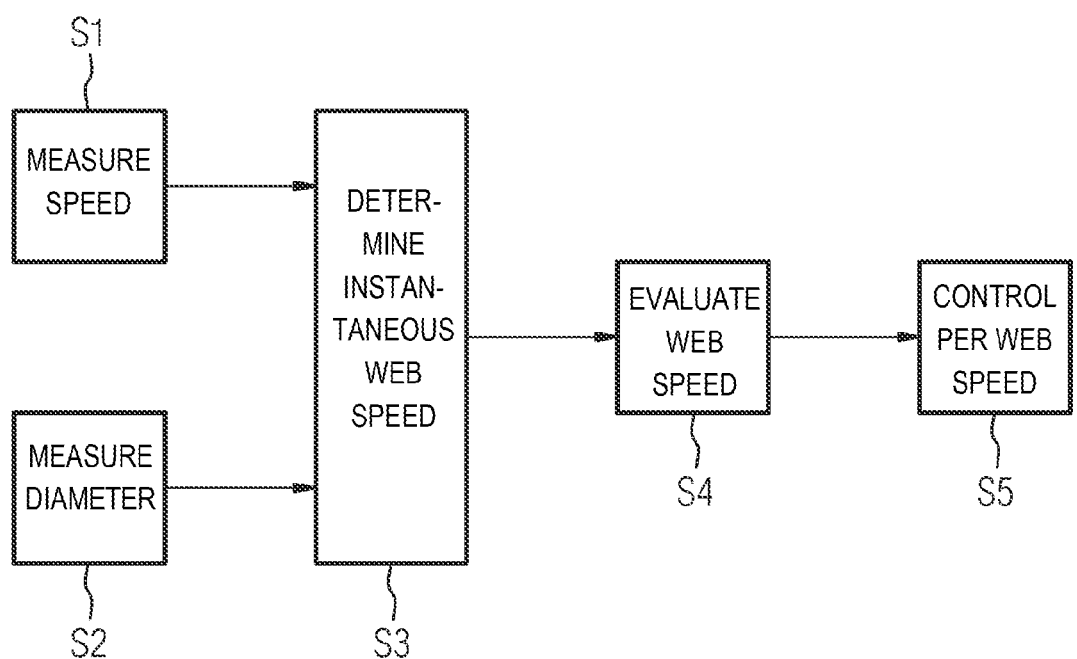

MONITORING WEB SPEED OF MATERIAL WEB

CROSS REFERENCE TO RELATED APPLICATIONS

This application is the U.S. national stage of International Application No. PCT/EP2013/053865, filed Feb. 27, 2013 and claims the benefit thereof. The International Application claims the benefit of German Application No. 102012203002.6 filed on Feb. 28, 2012, both applications are incorporated by reference herein in their entirety.

BACKGROUND

Described below are a method and a device for monitoring a web speed of a material web moved by rollers.

Material web is to be understood as meaning a web of flat material, e.g. of paper, plastic or metal.

In machines having continuous material webs moved by rollers, the circumferential speeds of the driving rollers and the related web speed of the material webs must be monitored. In particular, two speed threshold values must be taken into account: a maximum mechanical web speed which must not be exceeded in order to prevent damage to the machine, and a so-called safe speed which allows the operators to enter hazardous areas while the machine is in motion, e.g. to carry out maintenance work.

DE 44 30 550 A1 discloses a method for controlling web speeds in a device for transporting an elastic material web or stretching a plastically deformable material web, wherein the transporting or stretching is accomplished by electric drives in rotational speed control circuits. From a master speed of the material web and the respective elongation, associated web speed target values are determined from which a target rotational speed for the rotational speed control circuit is determined using the diameters of rollers connected to the drives and possibly by gear ratios.

DE 101 04 795 A1 discloses target value correction for an electrically open- or closed-loop controlled slave axis which follows a master movement of a higher-order master axis according to a predefined functional relationship. A respective actual position value of the master axis for controlling the slave axis is increased by a position correction value.

DE 26 13 600 A1 discloses a rotational speed control system for a web-conveying machine, wherein rotational speed controllers for rolls having identical diameters have identical rotational speed target values predefined for them, and suitable rotational speed target values which are corrected by strip tension controllers are provided for rolls or more precisely groups of rolls having a diameter at variance with a master roll diameter.

DE 692 02 132 T2 discloses a drive system for web conveyors with a drive roller device having a plurality of web drive rollers each having an independent motor drive linked to the drive rollers, wherein each motor drive has a way to produce an output signal corresponding to its respective motor drive current.

SUMMARY

Described below are an improved method and an improved device for monitoring a web speed of a material web moved by rollers.

According to the method for monitoring a web speed of a material web moved by rollers, a drive roller is driven by a motor. An instantaneous rotational speed of the motor is measured and an instantaneous web speed is determined from the measured rotational speed and a diameter of the drive roller. The instantaneous web speed determined is compared with a predefined speed target value and a predefined speed threshold value of the web speed. The motor is switched off if the instantaneous web speed determined is greater than the speed threshold value for longer than a second tolerance period which is predefined, or if the deviation of the determined instantaneous web speed from the speed target value is greater than a tolerance deviation which is predefined, or if the instantaneous web speed determined is greater than the speed threshold value.

Measuring the instantaneous motor speed of the drive roller advantageously enables the web speed of the material web to be determined simply and accurately. Comparison of the determined web speed with a speed target value and a speed threshold value allows adherence to a web speed value to be monitored and the web speed to be limited.

Switching off the motor in the event of the instantaneous web speed determined deviating from the speed target value by more than a tolerance deviation makes it possible, by switching off the motor, to react to possible mis-measurements of the motor speed resulting in incorrect determination of the web speed and manifesting itself in a corresponding deviation of the determined web speed from the speed target value.

Switching off the motor in the event of the instantaneous web speed determined being greater than the speed target value advantageously makes it possible to prevent the web speed from becoming so high that it damages a machine processing the material web or endangers machine operating personnel, e.g. when engaged in machine maintenance.

Switching off the motor in the event of the instantaneous web speed determined being greater than the speed threshold value for longer than a tolerance period advantageously takes into account that the motor does not need to be switched off immediately each time it is ascertained that the speed threshold value has been exceeded. For example, the motor does not need to be switched off when determination of the instantaneous web speed is imprecise because of control-related and/or measurement-related fluctuations and therefore occasionally falsely indicates that the speed threshold value has been exceeded when this is not actually the case and/or if the web speed only briefly exceeds the speed threshold value.

An embodiment provides for pre-defining a first tolerance period and switching off the motor if the difference between the instantaneous web speed determined and the speed target value remains constant for longer than the tolerance period.

This embodiment advantageously counteracts possible tampering with the web speed monitoring, the tampering giving a false indication that the determined web speed coincides with the speed target value when this is not actually the case. This makes use of the fact that a comparatively long constancy of the difference between the determined instantaneous web speed and the speed target value is improbable and indicates tampering.

In another embodiment, a target value for the rotational speed of the motor is determined from the web speed target value and the drive roller diameter, and the motor's rotational speed is adjusted to the motor speed target value.

This embodiment makes it advantageously possible to adapt the motor's rotational speed to a change in the web speed target value and/or a change in the drive roller diameter.

In another embodiment, in the event of the drive roller having a diameter that changes over time, the diameter of the drive roller is measured periodically and the measured instantaneous diameter is used to determine the instantaneous web speed.

This embodiment relates to a drive roller onto which the material web is wound or from which the material web is unwound and whose diameter therefore changes over time. In this document, the instantaneous diameter of such a drive roller is accordingly to be understood as meaning the diameter of the roller having the part of the material web instantaneously wound thereon. Measuring an instantaneous diameter of such a drive roller is advantageous, as it is only the actual instantaneous diameter that will enable the instantaneous web speed to be reliably determined on the basis of the instantaneous rotational speed.

During each revolution of the drive roller, drive roller diameters may be measured at different points from at least one sensor position, for each revolution a largest and a smallest diameter of the measured diameters is determined, a tolerance difference for the diameters, a number of revolutions $N_1$ and a tolerance number $N_2$ are predefined, and the motor is switched off if the difference between the largest and the smallest diameter measured is greater than the tolerance difference for more than $N_2$ of $N_1$ consecutive revolutions of the drive roller.

Such measurement and evaluation of the diameter at different points of the drive roller during a revolution enables drive roller imbalance due, for example, to asymmetrical winding of the material web on the drive roller to be reliably detected, and the motor can be switched off if an imbalance is detected. This is advantageous, as an imbalance of this kind can destroy the machine even at low web speeds which are not taken into account by the speed threshold value.

The method is advantageously particularly suitable for monitoring the web speed of a material web in a paper machine, reel slitter or coater.

A device for monitoring a web speed of a material web moved by rollers using the method has a drive roller and a motor for driving the drive roller. It additionally has a rotational speed measuring unit for measuring the motor speed, and a control unit by which signals detected by the speed measuring unit can be evaluated to determine an instantaneous web speed and the motor can be switched off depending on the evaluation result.

If the drive roller has a diameter that varies over time, the device also may have at least one diameter measuring unit for measuring a drive roller diameter. In particular, the diameter measuring unit has a distance meter for measuring a distance between the distance meter and an external surface of the drive roller.

This allows execution of the method having the above mentioned advantages.

BRIEF DESCRIPTION OF THE DRAWINGS

These and other aspects and advantages will become clearer and more readily comprehensible in conjunction with the following description of exemplary embodiments which will be explained in greater detail with reference to the accompanying drawings in which:

FIG. 1 is a block diagram of a device for monitoring a web speed of a material web moved by rollers, and FIG. 2 is a block diagram of a method for monitoring a web speed of a material web moved by rollers.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

FIG. 1 is a block diagram of a device 1 for monitoring a web speed of a material web (not shown) in a machine processing the material web. For example, if the material web is paper and the machine is a paper machine, a reel slitter or coater. However, the specific nature of the material web and machine is not relevant.

The material web is moved by drive rollers 2, 3, 4. Each drive roller 2, 3, 4 is driven by a motor 5 via a motor shaft 6 not shown in greater detail here, and gears 7 likewise not shown in greater detail here.

In the example shown, a first drive roller 2 and a second drive roller 3 are constant-diameter rollers serving only to drive the material web, without the material web being wound onto these drive rollers 2, 3 or unwound therefrom. A third drive roller 4 is a variable-diameter roller onto which the material web is wound or from which the material web is unwound.

The motors 5 are each supplied with electrical power via a frequency converter 8. The frequency converters 8 are connected to a control unit 10 via a field bus 9, e.g. a PROFIBUS (=Process Field Bus), and are controllable.

For each motor 5 the device has a rotational speed measuring unit 11 for measuring a rotational speed of the respective motor 5. The motor speed measured by a rotational speed measuring unit 11 is transmitted via the frequency converter 8 assigned to the respective motor 5 and the field bus 9 to the control unit 10 and is evaluated by the control unit 10 in the manner described in greater detail below. In the example, shown, the rotational speed measuring unit 11 assigned to the first drive roller 2 has an optional transducer signal evaluator 12 by which a transducer signal is made available in a suitable form for the associated frequency converter 8.

The control unit 10 is connected to peripheral devices 15 to 21 via a first peripheral module 13 and a second peripheral module 14. The peripheral modules 13, 14 are essentially of identical design. In the example shown, the peripheral devices 15 to 21 are a diameter measuring unit 15, emergency stop switches 16, safety switches 17, display elements 18, at least one safety door 19, at least one photoelectric sensor 20, and a contactor unit 21.

The diameter measuring unit 15 periodically measures a diameter of the third drive roller 4. For this purpose it has a distance meter for measuring a distance of the distance meter from an external surface of the third drive roller 4. The signals acquired by the diameter measuring unit 15 are transmitted to an analog submodule 14.1 of the second peripheral module 14 and forwarded to the control unit 10 by a communication submodule 14.0 of the second peripheral module 14.

The emergency stop switches 16 allow manual delayed shutdown of the drives bringing them to a standstill. The safety switches 17 allow manual shutdown of the drives, startup and shutdown of the drives here being equated with electrically switching all the motors 5 on and off. The emergency stop switches 16 and the safety switches 17 are each connected to a digital submodule 14.2 of the second peripheral module 14, via which submodule they transmit their respective switching state to the communication submodule 14.0. These switching states are forwarded to the control unit 10 by the second peripheral module 14.

Each display element 18 is assigned to a safety switch 17 and displays the latter's switching state. For this purpose it is connected to the first peripheral module 13 via which it is controlled. Each display element 18 has a light emitting diode which is forward biased, for example, if the drives are shut down by the associated safety switch 17.

The safety door 19 and the photoelectric sensor 20 are used for machine access control. The photoelectric sensor 20 is used to monitor access to the machine, and the safety door 19 is used to allow access to the machine only in situations deemed to be non-hazardous. The safety door 19 and the photoelectric sensor 20 are connected to a digital submodule 14.2 of the second peripheral module 14 via which the states of the safety door 19 (locked or unlocked) and the signals of the photoelectric sensor 20 can be controlled and monitored respectively. Instead of only one safety door 19 and only one photoelectric sensor 20, a plurality of safety doors 19 and photoelectric sensor 20 can also be provided. For example, safety doors 19 and photoelectric sensors 20 can be provided which only allow/monitor access to a particular area of the machine.

The motor of the third drive roller 4 can be switched off and on via the contactor unit 21. The contactor unit 21 is connected to a digital output 14.3 of the second peripheral module 14 and can be controlled via the output by the control unit 10 via the second peripheral module 14.

The motors 5 of the other two drive rollers 2, 3 can be switched on and off directly by the control unit 10 via the field bus 9, as indicated by the dashed-line section of the field bus 9.

FIG. 2 is a block schematic of operations S1 to S5 of a method for monitoring the web speed of the material web moved by the drive rollers 2, 3, 4.

In the method, in a first operation S1, the instantaneous rotational speeds of the motors 5 are measured by the rotational speed measuring units 11 and simultaneously, in a second operation S2, the instantaneous diameter of the third drive roller 4 is measured by the diameter measuring unit 15 (the constant diameters of the two other drive rollers 2, 3 are stored in the control unit 10). The rotational speeds are measured on the motor shafts 6 of the motors 5. An initial value of the diameter of the third drive roller 4 is either entered manually or determined by equation [1] and the data assigned to the other drive rollers 2, 3.

The measured rotational speeds and diameters are transmitted to the control unit 10. To exclude the possibility of rotational speed target values being transmitted back to the control unit 10 as actual rotational speed values due to unreliable communication, the measured rotational speeds may be permanently monitored for signal noise. The monitoring for signal noise is also used to detect frozen communication.

In a third operation S3, an instantaneous web speed $v_{actual}$ of the material web is determined by the control unit 10 for at least one drive roller 2, 3, 4 according to $$V_{actual} = \pi d \, n/i \qquad [1]$$

where n denotes the measured rotational speed of the associated motor 5, d the diameter and i the gear ratio of the respective drive roller 2, 3, 4 and π is the number pi (therefore i denotes the ratio of the rotational speeds of the respective motor shaft 6 and drive roller 2, 3, 4).

In a fourth operation S4, the instantaneous web speed determined is evaluated by the control unit 10 and, in the fifth operation S5, the machine is finally shut down by the control unit 10 if necessary depending on the evaluation result.

To evaluate the determined instantaneous web speed $V_{actual}$, it is compared with a predefined speed target value $v_{target}$, a predefined speed threshold value $v_{max}$ and a speed limit value $v_{limit}$ of the web speed. $v_{target}$, $v_{max}$ and $V_{limit}$ are here dependent on the operating state of the machine. In a maintenance state of the machine, the speed threshold value $v_{max}$ is a creep speed of the material web and $V_{limit}$ a web speed which must not be exceeded in order not to endanger operating personnel in and around the machine. For example, in the maintenance state $v_{limit} = 1.5 \, v_{max}$ and $v_{max} = 15$ m/min in order to reduce the risk to operating personnel to an acceptable level. During normal operation, $v_{max}$ is much higher than the creep speed and $v_{limit}$ is a maximum mechanical web speed that must not be exceeded in order to avoid damage to the machine. The speed target values $v_{target}$ during maintenance and normal operation are correspondingly different and are adjusted to the corresponding speed threshold values $v_{max}$. The speed threshold values $v_{max}$ and speed limit values $v_{limit}$ for the different operating states are stored as fixed values in a safety program that is executed by the control unit 10.

To evaluate $v_{actual}$, a tolerance deviation from $v_{target}$ is predefined. The machine is shut down if $v_{actual}$ deviates from $v_{target}$ by more than the tolerance deviation. This action serves to allow for mis-measurements of the rotational speeds of the motors 5 and/or of the diameter of the third drive roller 4 resulting in incorrect determination of $V_{actual}$. Shutdown of the machine (i.e. of the motors 5) takes place normally ("operational shutdown") as long as $v_{actual}$ does not exceed the speed threshold value $v_{max}$, as in this case there is no risk of a dangerous machine state and therefore emergency shutdown is unnecessary.

To protect against tampering, the machine is also operationally shut down if the difference between $v_{actual}$ and $v_{target}$ remains constant for longer than a predefined first tolerance period, i.e. in particular if $v_{actual}$ and $v_{target}$ coincide for longer than the first tolerance period. The duration of a number of revolutions of a drive roller 2, 3, 4 may be predefined as the first tolerance period. In one embodiment of the example, the machine is also operationally shut down if exactly identical speeds are determined for a suitably defined number of consecutive motor revolutions, e.g. for two consecutive revolutions, as even this behavior is improbable and indicates tampering or a system fault.

If $v_{actual}$ is greater than $v_{max}$, safe shutdown of the machine takes place. In a modified exemplary embodiment, safe shutdown of the machine only takes place if $v_{actual}$ is greater than $v_{max}$ for longer than a predefined second tolerance period, provided $v_{actual}$ does not exceed $v_{limit}$ during the second tolerance period. In another variant of the exemplary embodiment, in the event that $v_{max}$ is the creep speed and $v_{limit} > v_{actual} > v_{max}$, the machine only needs to be shut down if a safety door 19 is unlocked or a person is in the machine area protected by the safety door 19.

In the $v_{actual} > v_{limit}$ case, the machine immediately undergoes emergency shutdown in any case.

For the third drive roller 4, an associated instantaneous target rotational speed $n_{target}$ of the associated motor 5 is determined from the respective web speed value $v_{target}$ and the measured instantaneous diameter on the basis of equation [1] and is set accordingly.

In the case of the third drive roller 4, breakage of the associated motor shaft 6 can be detected by analyzing the measured rotational speed and the measured diameter, as the rotational speed at the motor shaft 6 and the diameter can be measured irrespective thereof on the third drive roller 4. If shaft breakage is detected, the machine is likewise shut down.

As soon as maintenance mode of the machine is selected as the operating state, operational deceleration of the material web to a web speed that is lower than the creep speed takes place. As soon as the speed falls below creep speed for all the drives, the web speed is monitored with the creep speed as $v_{max}$ as described above. In addition, a release signal is transmitted in a fail-safe manner which indicates that creep speed has been reached and is used as clearance for unlocking the safety doors 19.

Another embodiment of the method additionally provides imbalance monitoring of the third drive roller 4. For this purpose the diameter of the third drive roller 4 is measured periodically at a sufficiently high sampling rate, e.g. at least five times per revolution of the third drive roller 4. From these measurements, a largest and a smallest measured diameter is determined for each revolution. An excessively large discrepancy between these two diameter values indicates an imbalance of the third drive roller 4 which is due, for example, to asymmetric winding of the material web on the third drive roller 4. Such an imbalance can destroy the machine even at considerably lower web speeds than the maximum mechanical web speed which is set as $v_{limit}$ during normal operation. Imbalance monitoring is therefore an advantageous embodiment.

However, as the measurements of the diameter of the third drive roller 4 are in general relatively imprecise, smoothing of the measurements which takes into account a plurality of revolutions of the third drive roller 4 will be carried out. For this purpose a tolerance difference for the measured diameters, a number of revolutions $N_1$ and a tolerance number $N_2$ are predefined. The machine is shut down if the difference between the largest and the smallest diameter measured during a revolution is greater than the tolerance difference for more than $N_2$ of $N_1$ consecutive revolutions of the third drive roller 4. For example, for $N_2=N_1/2$, the machine is shut down if the difference is greater than the tolerance difference for more than half of the $N_1$ revolutions.

The diameter measurements are continuously monitored for plausibility on the basis of the rotational speed measurements carried out in parallel in order to be able to diagnose failure of the diameter measurements.

Although the method and device have been illustrated and described in detail by an exemplary embodiment, the invention is not limited by the disclosed examples, and other variations can be inferred therefrom by the average person skilled in the art without departing from the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for monitoring a web speed of a material web moved by rollers, comprising:
    driving a drive roller by a motor;
    measuring an instantaneous rotational speed of the motor;
    determining an instantaneous web speed from the rotational speed of the motor as measured and a diameter of the drive roller;
    comparing the instantaneous web speed with a speed target value and a speed threshold value of the web speed;
    switching off the motor when the instantaneous web speed is greater than the speed threshold value for longer than a tolerance period; and
    switching off the motor when a deviation of the instantaneous web speed from the speed target value is greater than a tolerance deviation.

2. The method as claimed in claim 1, wherein the drive roller is driven by the motor via gears.

3. The method as claimed in claim 2, wherein a first tolerance period is predefined and the motor is switched off if the difference between the instantaneous web speed determined and the speed target value remains constant for longer than the first tolerance period.

4. The method as claimed in claim 3, wherein a rotational speed target value for the rotational speed of the motor is determined from the speed target value and the diameter of the drive roller, and the rotational speed of the motor is adjusted to the rotational speed target value.

5. The method as claimed in claim 4, wherein the diameter of the drive roller varies over time, as the material web is wound or unwound, further comprising periodically measuring the diameter of the drive roller and determining the instantaneous web speed as a function of the instantaneous diameter measured.

6. The method as claimed in claim 5,
    wherein, during each revolution of the drive roller, diameters of the drive roller are measured at different points, for each revolution a largest and a smallest measured diameter of the measured diameters is determined, a tolerance difference for the diameters, a number of revolution $N_1$ and a tolerance number $N_2$ are predefined, and the motor is switched off if the difference between the largest and the smallest diameter measured is greater than the tolerance difference for more than $N_2$ of $N_1$ consecutive revolutions of the drive roller.

7. The method as claimed in claim 6, wherein the motor is switched off if exactly the same rotational speeds are measured for a predefined number of consecutive motor revolutions.

8. The method as claimed in claim 7, further comprising monitoring the web speed of the material web in at least one of a paper machine, a reel slitter and a coater.

9. A device for monitoring a web speed of a material web moved by a drive roller driven by a motor, comprising:
    a speed measuring unit measuring a rotational speed of the motor; and
    a control unit evaluating signals acquired by the speed measuring unit to determine an instantaneous web speed based on the rotational speed of the motor and a diameter of the drive roller, and switching off the motor when the instantaneous web speed is greater than a speed threshold value for longer than a tolerance period and when a deviation of the instantaneous web speed from a speed target value is greater than a tolerance deviation.

10. The device as claimed in claim 9, further comprising at least one diameter measuring unit measuring the diameter of the drive roller because the drive roller has a diameter which varies over time as the material web is wound or unwound.

11. The device as claimed in claim 10, wherein the at least one diameter measuring unit comprises a distance meter measuring a distance of the distance meter from an external surface of the drive roller.

* * * * *